US012625526B2

(12) United States Patent
Cheung et al.

(10) Patent No.: US 12,625,526 B2
(45) Date of Patent: May 12, 2026

(54) BUTTON MECHANISM FOR WATERPROOF HOUSING

(71) Applicant: Apple Inc., Cupertino, CA (US)

(72) Inventors: Matthew J. Cheung, Castro Valley, CA (US); Colin T. McLain, San Jose, CA (US)

(73) Assignee: APPLE INC., Cupertino, CA (US)

( * ) Notice: Subject to any disclaimer, the term of this patent is extended or adjusted under 35 U.S.C. 154(b) by 386 days.

(21) Appl. No.: 17/806,043

(22) Filed: Jun. 8, 2022

(65) Prior Publication Data

US 2023/0400893 A1     Dec. 14, 2023

(51) Int. Cl.
| | |
|---|---|
| *G06F 1/16* | (2006.01) |
| *H01H 13/06* | (2006.01) |
| *H01H 13/14* | (2006.01) |
| *H04B 1/38* | (2015.01) |
| *H04B 1/44* | (2006.01) |

(52) U.S. Cl.
CPC .......... *G06F 1/1698* (2013.01); *G06F 1/1656* (2013.01); *G06F 1/1683* (2013.01); *H01H 13/06* (2013.01); *H01H 13/14* (2013.01); *H04B 1/44* (2013.01); *H04B 2001/3894* (2013.01)

(58) Field of Classification Search
CPC .... G06F 1/1698; G06F 1/1656; G06F 1/1683; G06F 1/1616; G06F 1/1626; G06F 1/163; G06F 1/1671; G06F 1/169; G06F 3/0202; G06F 3/03547; H01H 13/06; H01H 13/14; H04B 1/44; H04B 2001/3894; H03K 2217/958; H03K 17/97

See application file for complete search history.

(56) References Cited

U.S. PATENT DOCUMENTS

| | | | | |
|---|---|---|---|---|
| 2010/0007402 A1* | 1/2010 | Chamuczynski | ...... | H03K 17/97 |
| | | | | 327/510 |
| 2010/0258425 A1* | 10/2010 | Takahashi | ................ | H01H 1/10 |
| | | | | 200/341 |
| 2011/0063404 A1* | 3/2011 | Raffle | .................... | H04N 7/148 |
| | | | | 348/E7.083 |
| 2012/0071087 A1* | 3/2012 | Griffin | .................... | H04W 4/21 |
| | | | | 455/41.1 |
| 2015/0193011 A1* | 7/2015 | Shen | .................... | G06F 3/0202 |
| | | | | 345/168 |

(Continued)

*Primary Examiner* — Allen L Parker
*Assistant Examiner* — Keon Kim
(74) *Attorney, Agent, or Firm* — Dorsey & Whitney LLP

(57) ABSTRACT

An electronic device can include: a housing defining an exterior surface and an internal volume, the exterior surface defining a recess having a base portion and a sidewall, the housing forming a continuous component; a button body positioned within the recess; an emissive object attached to the button body, the emissive object being movable between a first position and a second position and configured to emit electromagnetic radiation; a first sensor positioned within the internal volume and configured to generate a first signal in response to detecting electromagnetic radiation in the first position; a second sensor positioned within the internal volume and configured to generate a second signal; a processor positioned within the internal volume, and in electrical communication with the first sensor and the second sensor; and a memory having electronic instructions that cause the processor to respond to the first signal and the second signal.

20 Claims, 8 Drawing Sheets

(56)  References Cited

U.S. PATENT DOCUMENTS

| | | | |
|---|---|---|---|
| 2016/0225551 A1* | 8/2016 | Shedletsky | ........ H03K 17/9625 |
| 2018/0075682 A1* | 3/2018 | Brockman | .......... E05B 47/0004 |
| 2019/0228927 A1 | 7/2019 | Teplitxky et al. | |
| 2021/0090824 A1* | 3/2021 | Kobuchi | ................ H01H 13/14 |
| 2021/0096647 A1* | 4/2021 | Amin-Shahidi | ........ G06F 3/016 |
| 2021/0211130 A1* | 7/2021 | Bilbeisi | ................ H03K 17/962 |
| 2022/0091197 A1* | 3/2022 | Huang | .................. G06F 1/1618 |

* cited by examiner

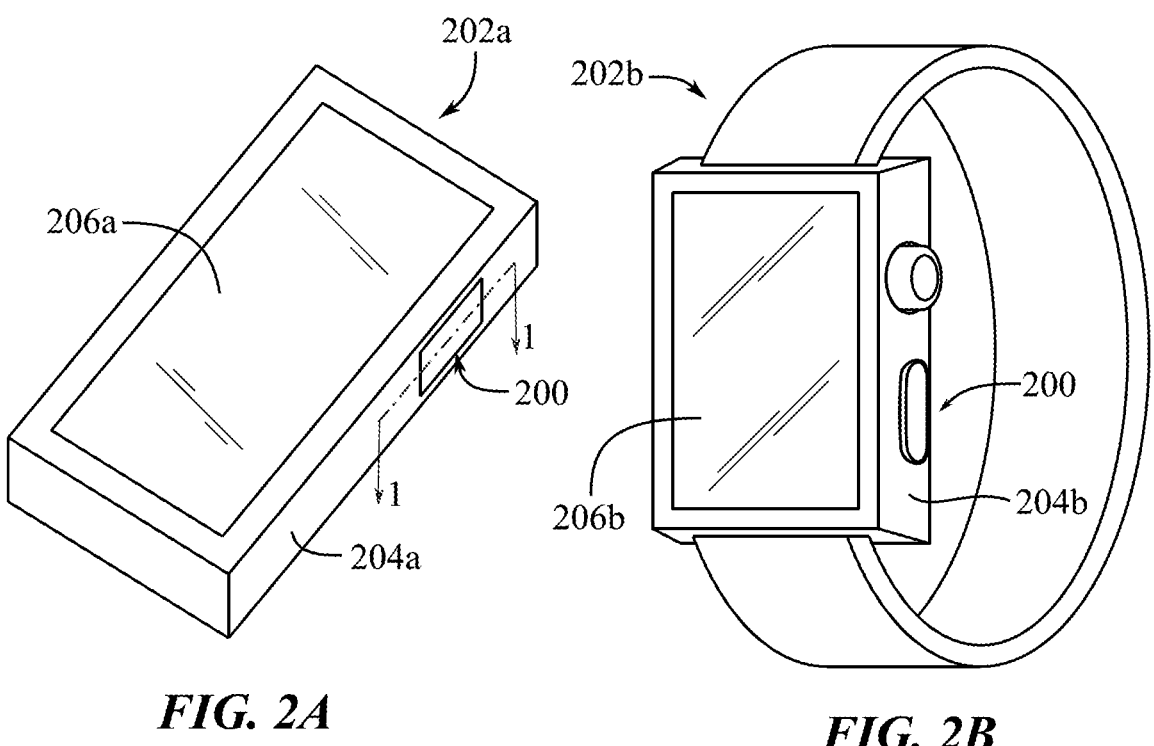
FIG. 2A
FIG. 2B
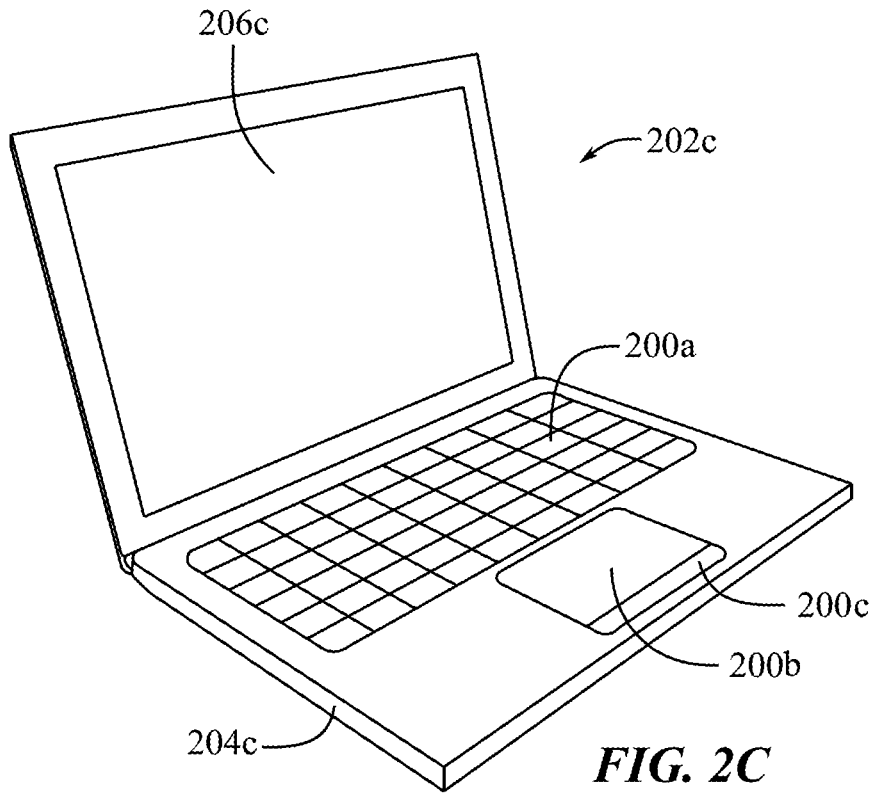
FIG. 2C

700

703 DETECT SIGNAL BY A FIRST SENSOR

705 COMPARE SIGNAL AGAINST PREDETERMINED METRIC

707 DETERMINE IF SIGNAL IS DETECTED BY A SECOND SENSOR

709 COMPARE SIGNALS AT FIRST AND SECOND SENSORS

711 DETERMINE IF INPUT MEMBER WAS PRESSED

713 EXECUTE FUNCTION OF INPUT MEMBER

BUTTON MECHANISM FOR WATERPROOF HOUSING

FIELD

The described embodiments relate generally to electronic devices. More particularly, this disclosure relates to button assemblies in an electronic device. Still more particularly, the present invention relates to a waterproof button mechanism.

BACKGROUND

Many traditional electronic devices include buttons, keys, or other types of input members. Traditional buttons may be difficult to seal and may allow for ingress of liquid and other contaminants into the housing of the electronic device. Systems and devices described herein include waterproof button mechanisms that address these and other issues that are associated with traditional buttons.

SUMMARY

According to some aspects, an electronic device can include a housing defining an exterior surface and an internal volume. The exterior surface can define a recess having a base portion and a sidewall, the base portion, the sidewall, and the housing forming a continuous component. The electronic device can include a button body positioned within the recess. An emissive object can be attached to the button body, the emissive object being movable between a first position and a second position, the emissive object configured to emit electromagnetic radiation. A first sensor can be positioned within the internal volume. The first sensor can generate a first signal in response to detecting electromagnetic radiation of the emissive object in the first position. A second sensor can be positioned within the internal volume and can generate a second signal. A processor can be in electrical communication with the first sensor and the second sensor. A memory can have electronic instructions encoded thereon that, when executed by the processor, cause the processor to respond to the first signal and the second signal.

In some examples, the electronic device can include a motion guide extending from the button body into the recess to guide the button body linearly toward the base portion. The electronic device can include a retention component to retain the button body within the recess. The base portion can define a cavity receiving the motion guide and the retention component. The emissive object can include a magnet. The emissive object can include a near-field communications tag.

In some examples, the emissive object can be a first emissive object, the electronic device can further include a second emissive object to emit a second electromagnetic radiation, wherein the second sensor can detect the second electromagnetic radiation. The electronic device can include a third sensor configured to generate a third signal, wherein the instructions are configured to cause the processor to compare the first signal, the second signal, and the third signal.

In some examples, the first sensor and the second sensor can be positioned at a first distance from the button body, and the third sensor can be positioned a second, different distance from the button body relative to the first distance. The instructions can cause the processor to determine if the button body was pressed based on the third signal and based on at least one of the first signal and the second signal. The continuous component can fluidically isolate the internal volume from the exterior surface.

According to some aspects, an input assembly can include a waterproof wall defining an exterior surface and an interior surface, the exterior surface being exposed to an ambient environment, the interior surface being fluidically isolated from the ambient environment. An input member can be attached to the exterior surface and movable relative to the exterior surface. The input member can include a retention feature to limit movement of the input member relative to the waterproof wall. A first movable object can be attached to the input member. A second movable object can be attached to the input member. A first sensor can be positioned at the interior surface and configured to monitor motion of the first movable object through the waterproof wall. A second sensor can be positioned at the interior surface and configured to monitor motion of the second movable object through the waterproof wall. A processor can detect when the input member is depressed beyond a predetermined threshold distance relative to the waterproof wall based on the first signal and the second signal.

In some examples, the input assembly can include a return mechanism disposed between the input member and the waterproof substrate. The return mechanism can be tuned to provide feedback substantially simultaneous with the processor determining that the input member has been depressed beyond the predetermined threshold. The input assembly can include a third movable object and a third sensor configured to monitor motion of the third movable object.

In some examples, the retention feature can include a first shaft, a second shaft, and a third shaft, each shaft extending from the input member into corresponding apertures defined by the exterior surface, the first movable object attached to the first shaft, the second movable object attached to the second shaft, the third movable object attached to the third shaft. The third sensor can be positioned within a cavity defined by the interior surface, the third sensor being a first distance from the exterior surface, the first sensor and second sensor being a second, greater distance from the exterior surface.

According to some aspects, an electronic device can include a housing defining an exterior surface and an internal volume, the exterior surface defining a recess. A transmissive barrier can form a waterproof interface between the recess and the internal volume. A button can be positioned at least partially within the recess. A radiating object can be attached to the button and positioned within the recess. A sensor can be positioned within the internal volume, the sensor configured to monitor a position of the radiating object through the transmissive barrier and generate a signal in response to the position of the radiating object. A controller can be disposed in the internal volume to monitor motion of the button based on the signal from the sensor.

In some examples, the transmissive barrier can be permissive of electromagnetic waves passing between the aperture and the internal volume. The housing can include a first material, and the transmissive barrier can include a second material, wherein the second material is different from the first material.

BRIEF DESCRIPTION OF THE DRAWINGS

The disclosure will be readily understood by the following detailed description in conjunction with the accompanying drawings, wherein like reference numerals designate like structural elements, and in which:

FIG. 2A shows a perspective view of an electronic device.

FIG. 2B shows a perspective view of an electronic device.

FIG. 2C shows a perspective view of an electronic device.

DETAILED DESCRIPTION

Figure 1:
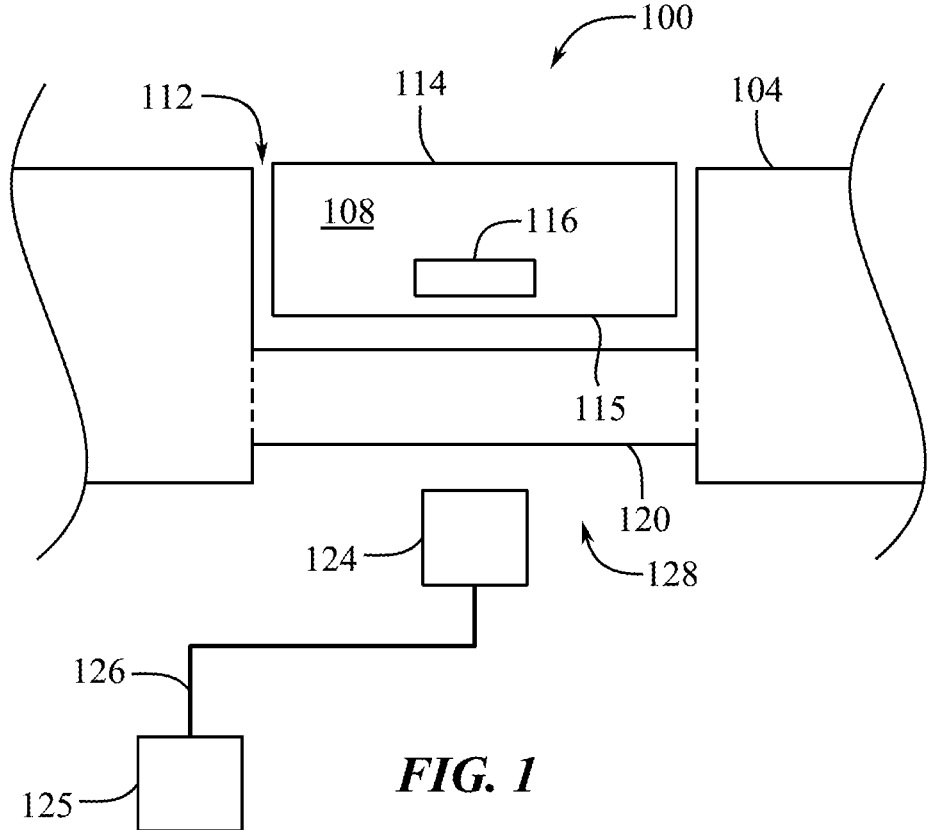
FIG. 1 shows a schematic side cross-sectional view of a button assembly.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Many electronic devices have input members such as buttons that are exposed on an exterior of the device, allowing a user to interact with the device to provide inputs or commands. Conventional input mechanisms require that one or more portions of the button pass from the exterior of the device through the wall of the housing and into an internal volume of the electronic device (e.g., through a passage or opening formed in the wall of the housing). This "pass-through" can create water ingress paths, potentially exposing the sensitive internal electronics to water damage. Understandably, devices with a higher number of input members have a higher risk of seal failure and water damage. Traditionally, water resistant items such as seals, o-rings, gaskets, or other similar sealing components have been used to mitigate water ingress. However, these types of seals degrade throughout a product's lifetime, and over prolonged periods of use, thereby lessening their effectiveness.

Described herein are waterproof input assemblies that do not require a "pass-through" configuration. As used herein, "waterproof" refers to two or more volumes or components being fluidically isolated from each other (i.e., not being in fluid communication). Further, "waterproof" as used herein is intended to convey that no openings or passages exist between the fluidically isolated regions, even those having movable (e.g., removable or elastically flexible) seals or gaskets positioned therein. Thus, the disclosed input assemblies have no path for water ingress, even with any and all elastic seals removed from the device, and they therefore do not share the same shortcomings of conventional seals (e.g., leak proclivity). The housing can be a unitary, continuous component that at least partially surrounds the button assembly. In other words, there are no pass-through openings, sealed or otherwise, connecting and extending between the exterior, exposed surface of the devices and the internal volume of the devices where components are intended to remain dry.

In some examples, the button assembly can include an exterior portion and an interior portion. The exterior portion of the button assembly can include an input surface which the user contacts, a motion guide that limits movement of the button, a return mechanism, and a detectable object, such as an emissive or radiating object. In various embodiments, no portion of these components of the external portion of the button assembly passes entirely through the housing into the internal volume of the electronic device (i.e., no through-holes are implemented in the wall of the device, so the device is waterproof where the button assembly is located, as explained above).

The external portion of the button assembly can also be referred to as the moving portion of the button assembly because it can move or translate in response to user input. The moving portion of the button assembly can include an object that can be detected by a sensor enclosed within the housing. Combinations of the objects and sensors can include magnets and magnetometers, radio frequency generator and radio antenna, or similar combinations of objects that emit or radiate electromagnetic waves or fields and sensors and are tuned to sense or detect such emissions, allowing the sensors to monitor the location and motion of the objects. In some examples, the internal portion (i.e., the components disposed in the internal volume) of the button assembly can include multiple sensors. A plurality of sensors can be used for accuracy and redundancy. For example, multiple sensors can be employed in order to avoid false positives of a button press or to avoid or filter noise or stray electromagnetic fields from the ambient environment.

As discussed in greater detail below, a computer can be used to process signals from the sensor (or sensors). The computer can generate a signal in response to the sensor detecting a reading beyond a predetermined threshold value. In other words, the sensor can output a signal in response to the presence of the field(s) output by the object, and the computer (e.g., a processor) can receive the sensor's signal output and can compare it to a threshold value. If the signal output exceeds the threshold value (or meets other criteria, such as having a threshold rate of signal change), the processor can take an action or output a second signal, such as by determining that the button assembly has been pressed and therefore triggering a function intended to coincide with operation of the button assembly by a user. If multiple emissive objects and/or sensors are used, the computer can be programmed to determine the button is pressed when one or more sensors, such as a single sensor or a specific combination of sensors, detect a reading beyond the predetermined threshold.

In some examples, the button assembly can be implemented as a trackpad. A trackpad implementation of the button assembly can include at least two, and, in some embodiments, three or more, sets of emissive objects and sensors to triangulate a touch of a user's finger. The trackpad may include its own power source and a transmitter to relay the information to a processor within a waterproofed internal volume. Another implementation of the button assembly can be a switch that travels in or along the plane of the external surface of the housing. Using similar mechanisms described herein, the button assembly can be implemented as a rotary dial or lever mechanism.

The button mechanism described herein can produce waterproof consumer electronic devices, such as mobile phones, tablets, smart watches, smart doorbell devices, headphones, earphones, laptops, etc. Other potential uses can include exterior automotive buttons or switches and water- or weather-proof camera or video camera equipment.

These and other embodiments are discussed below with reference to FIGS. 1-7. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 shows a side cross-sectional view of a button assembly 100. As will be described herein, the button assembly 100 can be waterproof, having no physical pathway between the button assembly 100 and an internal volume 128 defined by the housing 104. The button assembly 100 can include an input member or button 108. The button 108 can include an input surface 114 to receive user input, such as a touch or push from the user's finger. The input surface 114 can be made of any number of materials and can be constructed to receive any number of different types of inputs (e.g., pushes, slides, touches, etc.).

The input surface 114 of the button 108 can be considered an exterior of the button assembly 100 and/or an exterior of the electronic device because it is exposed to, and accessible from, the exterior of the device. The exterior surface of the housing 104 can also be considered an exterior of the electronic device.

In some examples, the button assembly 100 can include an emissive object 116. The emissive object 116 can be attached or coupled to the button 108. In some embodiments, the emissive object 116 can be encapsulated within the button 108. In some examples, the button 108 itself can be the emissive object 116. The emissive object 116 can move as the button 108 moves. The emissive object 116 can have physical characteristics or structures with electromagnetic emitting or radiating properties, and waves emitted from the object 116 can be transmissible through a waterproof barrier or wall of the housing 104 to be detectable by sensors. For example, the emissive object 116 can emit electromagnetic waves. As used herein, "electromagnetic" includes electrical fields and/or magnetic fields across any spectrum, such as, for example, radio waves, visible light, infrared (IR) light, and ultraviolet (UV) light. Electromagnetic radiation or an electromagnetic field can include a magnetic field or flux emitted by a permanent magnet, a ferromagnet, an electro-magnet, or similar structure. Thus, in some configurations, the emissive object 116 can include a magnetic structure such as a permanent magnet or an electromagnet (e.g., a conductive coil or a coil plus a core). In some examples, the emissive object 116 includes a near-field communications (NFC) component, such as an NFC chip. In some examples, the emissive object 116 includes a radio frequency identification (RFID) tag. The emissive object 116 can be either passive or active in its emission. For example, a passive emissive object 116 (e.g., an NFC tag) can be configured to emit a field detectable by a sensor in the housing 104 only when brought within a predetermined range of an emitter (typically also in the housing 104) and a current is wirelessly and remotely induced in the object 116 by the emitter. Thus, in some example embodiments, movement of the button 108 prompts or activates a detectable wireless emission by the emissive object 116. In some examples, the emissive object 116 can produce any suitable output detectable by a sensor through a wall or other interposed housing structure (e.g., output including acoustic output, optical reflections, ionizing radiation, etc.).

The button 108 and the emissive object 116 can be at least partially disposed within a recess 112 defined in or by the housing 104. In some examples, the recess 112 is entirely defined by the housing 104 (as shown in FIGS. 3A-7). In some examples, the recess 112 is defined by the housing 104 and a transmissive wall 120. The transmissive wall 120 can be an integral part of the housing 104 made of the same material as the housing 104 or can be formed on and affixed to the housing 104 and made of a different material from the housing. Thus, the housing 104 and the transmissive wall 120 can comprise different materials. In some examples, the housing 104 and transmissive wall 120 can be co-molded to form a continuous substrate. Together, the housing 104 and the transmissive wall 120 can form a waterproof barrier between the button 108 and an internal volume 128 defined by the housing 104.

Despite being non-permeable to liquid, the electromagnetic emissions from the emissive object 116 can pass through the transmissive wall 120 to reach a sensor 124 disposed inside the internal volume 128. The transmissive wall 120 can be optically transparent or translucent. The transmissive wall 120 can be made from a variety of materials, including, in some embodiments, radio-transparent materials and non-conductive materials.

The sensor 124 of the button assembly 100 can be positioned within the internal volume 128 of the electronic device. The sensor 124 can be tuned to sense or detect the electromagnetic emissions produced by the emissive object 116. Suitable sensors can include a magnetometer, a Hall-effect sensor, a strain gauge, a radio antenna, etc. In some examples, the sensor 124 is positioned beneath (as oriented in FIG. 1) the button 108 and the emissive object 116. In some examples, the sensor 124 can be positioned along a central axis of the button 108, the button 108 can be translatable along the central axis (e.g., a longitudinal axis of the button 108 along which the button 108 translates when being pressed toward the transmissive wall 120).

The sensor 124 can be attached to an interior side of the transmissive wall 120. In some examples, a gap or space exists between the transmissive wall 120 and the sensor 124. As discussed in greater detail below, the distance of the sensor 124 from the emissive object 116 can be predetermined to maximize the ability and effectiveness of the sensor 124 to detect electromagnetic emissions from the emissive object 116. In some examples, when the button 108 is in a first or rest state, extended away from the transmissive wall 120, the sensor 124 is unable to detect the electromagnetic emissions from the emissive object (or the electromagnetic emissions are not measured in excess of a predetermined threshold, e.g., to filter out noise or background emissions), but when the button 108 is depressed to a second state, closer to the transmissive wall 120, the sensor 124 is able to detect the signals from the emissive object 116 (or the signals meet or exceed the predetermined threshold). In some examples, the sensor 124 can continuously detect signals from the emissive object 116. The ability of the sensor 124 to detect the emissive object 116 allows the sensor 124 to monitor a position of the emissive object 116 and accordingly monitor the motion of the emissive object 116.

Figure 2D:
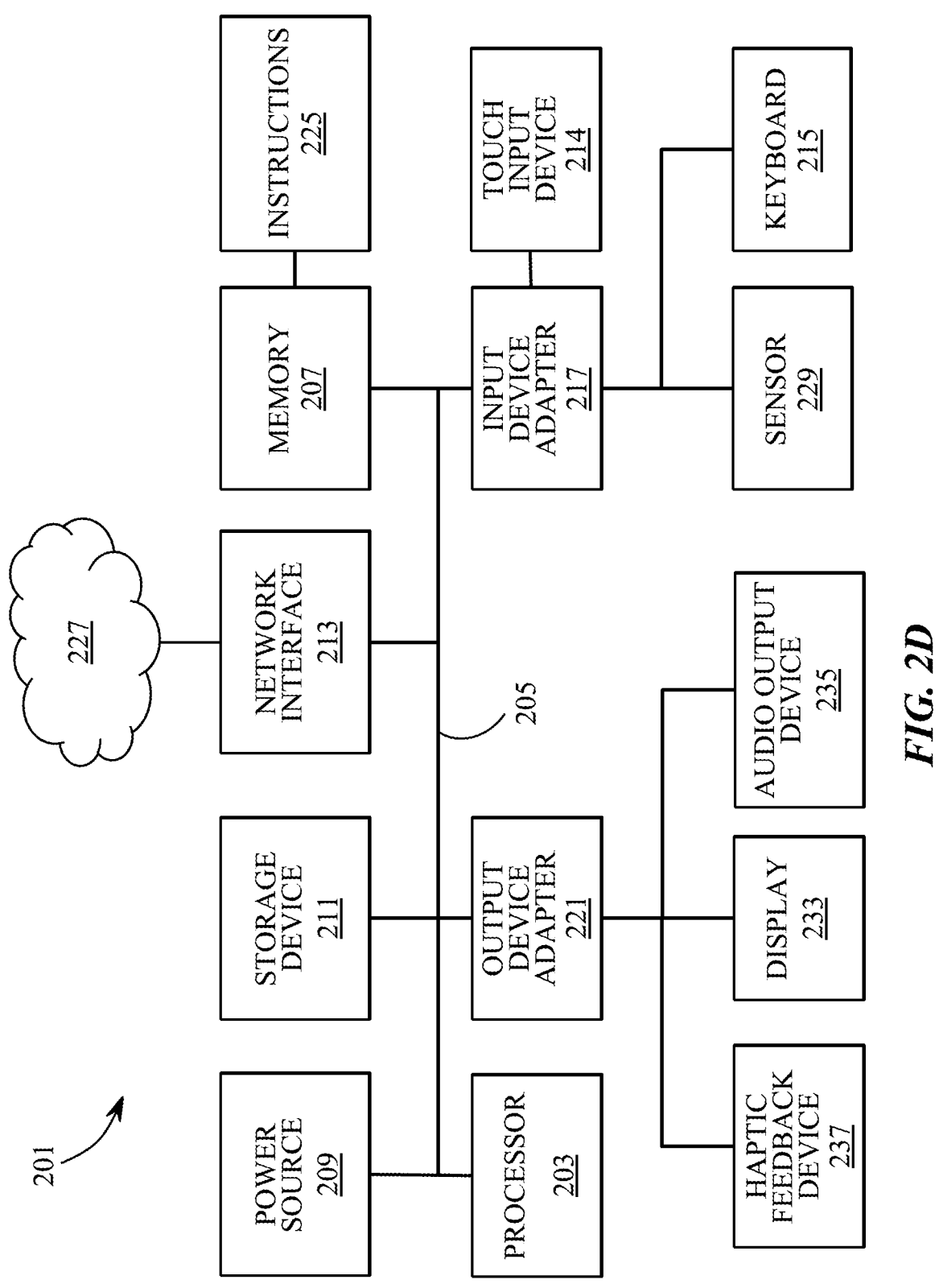
FIG. 2D shows a block diagram of a computer system.

The sensor 124 can be in electrical communication with a processor 125 housed within the internal volume 128 of the housing 104, as indicated schematically by electrical connection 126. As used herein, parts in "electrical communication" with each other are configured to exchange electrical signals, directly or indirectly, between each other, whether uni-directionally or bi-directionally. An object sensor (e.g., sensor 124) can be said to be in electrical communication with a processor or controller device if the processor or controller device is using signals generated by the object sensor or if the processor or controller device is using signals reliant upon or derived at least in part on the signals generated by the object sensor. For example, the object sensor can be in electrical communication with a processor via an input device adapter (i.e., a touch controller board or similar component) and an electrical communications bus, as indicated in FIG. 2D and described in further detail below. The button assembly 100 can include a memory having electronic instructions encoded thereon that, when executed by the processor 125, cause the processor 125 to respond to the signal produced by the sensor 124.

FIGS. 2A-2C illustrate various electronic devices that are capable of being used in conjunction with the button assembly described herein. The electronic devices can correspond to any form of a wearable electronic device, a portable media player, a media storage device, a portable digital assistant ("PDA"), a tablet computer, a computer, a mobile communication device, a head-mounted display, a GPS unit, a remote-control device, or any other electronic device. Specific examples of such devices are described below.

FIG. 2A illustrates an example electronic device 202a. In some examples, the electronic device is a mobile device 202a, such as a smartphone or tablet computer. The mobile device 202a of FIG. 2A is merely one representative example of a device that can be used in conjunction with the components and methods disclosed herein. Specifically, the mobile device 202a is merely one representative example of a device that can include a button assembly as described herein.

The mobile device 202a can include an enclosure or housing 204a. The housing 204a can be connected to or contain a visual display 206a. The housing 204a can include a button assembly 200 disposed at least partially within a recess or cavity of the housing 204a. The button assembly 200 can be substantially similar to, including some or all of the features of, the button assemblies described herein, including button assembly 100.

In some examples, the housing 204a contains or houses several components, such as a processor, sensors, battery, and other component, such as described in FIG. 2D. The housing 204a can substantially define at least a portion of an exterior surface of the mobile device 202a. The display 206a can include a touch sensitive surface, such as a touchscreen. The display 206a can define an exterior surface of the mobile device 202a. The housing 204a can also include features, such as charging port apertures or speaker openings that may or may not also be waterproof or water resistant.

FIG. 2B illustrates an example in which the electronic device is a wearable device 202b. The wearable device 202b can be a watch, such as a smartwatch. The wearable device 202b of FIG. 2B is merely one representative example of a device that can be used in conjunction with the components and methods disclosed herein. In other words, the wearable device 202b is one non-limiting example of a device that can include a button assembly as described herein.

The wearable device 202b can include an enclosure or housing 204b. The housing 204b can be connected to a front display 206b and can have a strap, loop, ring, band, belt, or similar body securement structure designed to attach the wearable device 202b to a user or to provide wearable functionality. The housing 204b can include the button assembly 200 disposed at least partially within a recess or cavity in the housing 204b. A number of input elements, such as a rotatable crown and/or additional buttons can be attached to and can protrude from the housing 204b. The additional input elements can also implement the same processes, methods, and mechanisms described herein to achieve a waterproof input element. The housing 204b can house several electrical and mechanical components within an internal volume defined by the housing 204b.

FIG. 2C illustrates an example in which the electronic device is a computer 202c, such as a laptop or desktop computer. The computer 202c of FIG. 2C is merely one representative example of a device that can be used in conjunction with the components and methods disclosed herein. Specifically, the computer 202c is one representative example of a device that can include a button assembly as described herein.

The computer 202c can include an enclosure or housing 204c. The housing 204c can be connected to a display 206c. The computer 202c can include multiple input members that incorporate the features of the button assemblies described herein. For example, the computer 202c can include a keyboard 200a, a trackpad 200b, and a button 200c, each of which can be attached to the housing 204c. The display 206c can include a touch sensitive surface, such as a touchscreen. The display 206c can define an exterior surface of the computer 202c.

The housing 204c can substantially define an internal volume and at least a portion of an exterior surface of the computer 202c. The housing 204c can also include features, such as charging port apertures. It will be understood that the housing 204c can include several interconnected components, including the button assemblies as described herein.

FIG. 2D shows a high-level block diagram of a computer system 201 that can be used to implement embodiments of the present disclosure. In various embodiments, the computer system 201 can comprise various sets and subsets of the components shown in FIG. 2D. Thus, FIG. 2D shows a variety of components that can be included in various combinations and subsets based on the operations and functions performed by the system 201 in different embodiments. For example, the computer system 201 can be part of the computing devices 202a, 202b, 202c described above in connection with FIGS. 2A, 2B, and 2C. It is noted that, when described or recited herein, the use of the articles such as "a" or "an" is not considered to be limiting to only one, but instead is intended to mean one or more unless otherwise specifically noted herein.

The computer system 201 can comprise a central processing unit (CPU) or processor 203 connected via a bus 205 for electrical communication to a memory device 207, a power source 209, an electronic storage device 211, a network interface 213, an input device adapter 217, and an output device adapter 221. For example, one or more of these components can be connected to each other via a substrate (e.g., a printed circuit board or other substrate) supporting the bus 205 and other electrical connectors providing electrical communication between the components. The bus 205 can comprise a communication mechanism for communicating information between parts of the system 201.

The processor 203 can be a microprocessor or similar device configured to receive and execute a set of instructions 225 stored by the memory 207. The memory 207 can be referred to as main memory, such as random access memory (RAM) or another dynamic electronic storage device for storing information and instructions to be executed by the processor 203. The memory 207 can also be used for storing temporary variables or other intermediate information during execution of instructions executed by the processor 203. The processor 203 can include one or more processors or controllers, such as, for example, a CPU for the computing device 201 in general and a touch controller or similar sensor or I/O interface used for controlling and receiving signals from the display 233 and any other sensors being used. The power source 209 can comprise a power supply capable of providing power to the processor 203 and other components connected to the bus 205, such as a connection to an electrical utility grid or a battery system.

The storage device 211 can comprise read-only memory (ROM) or another type of static storage device coupled to the bus 205 for storing static or long-term (i.e., non-dynamic) information and instructions for the processor 203. For example, the storage device 211 can comprise a magnetic or optical disk (e.g., hard disk drive (HDD)), solid state memory (e.g., a solid state disk (SSD)), or a comparable device.

The instructions 225 can comprise information for executing processes and methods using components of the system 201. Such processes and methods can include, for example, the methods described in connection with other embodiments elsewhere herein, such as the process described below with reference to FIG. 7.

The network interface 213 can comprise an adapter for connecting the system 201 to an external device via a wired or wireless connection. For example, the network interface 213 can provide a connection to a computer network 227 such as a cellular network, the Internet, a local area network (LAN), a separate device capable of wireless communication with the network interface 213, other external devices or network locations, and combinations thereof. In one example embodiment, the network interface 213 is a wireless networking adapter configured to connect via WI-FI®, BLUETOOTH®, BLE, Bluetooth mesh, or a related wireless communications protocol to another device having interface capability using the same protocol. In some embodiments, a network device or set of network devices in the network 227 can be considered part of the system 201. In some cases, a network device can be considered connected to, but not a part of, the system 201.

The input device adapter 217 can be configured to provide the system 201 with connectivity to various input devices such as, for example, a touch input device 214, a keyboard 215 or other peripheral input device, one or more sensors 229, related devices, and combinations thereof. In some configurations, the input device adapter 217 can include the touch controller or similar interface controller described above. The sensors 229 (e.g., sensor 124) can be used to detect physical phenomena in the vicinity of the computing system 201 (e.g., light, sound waves, electric fields, forces, strain, vibrations, etc.) and convert those phenomena to electrical signals. The keyboard 215 or another input device (e.g., buttons or switches) can be used to provide user input such as input regarding the settings of the system 201. In some embodiments, the input device adapter 217 can be connected to a stylus or other input tool, whether by a wired connection or by a wireless connection (e.g., via the network interface 213) to receive input via the touch input device 214 and via the tool.

The output device adapter 221 can be configured to provide the system 201 with the ability to output information to a user, such as by providing visual output using one or more displays 233 (e.g., displays 206a, 206b, 206c), by providing audible output using one or more speakers 235, or providing haptic feedback sensed by touch via one or more haptic feedback devices 237. Other output devices can also be used. The processor 203 can be configured to control the output device adapter 221 to provide information to a user via the output devices connected to the adapter 221.

Figure 3A:
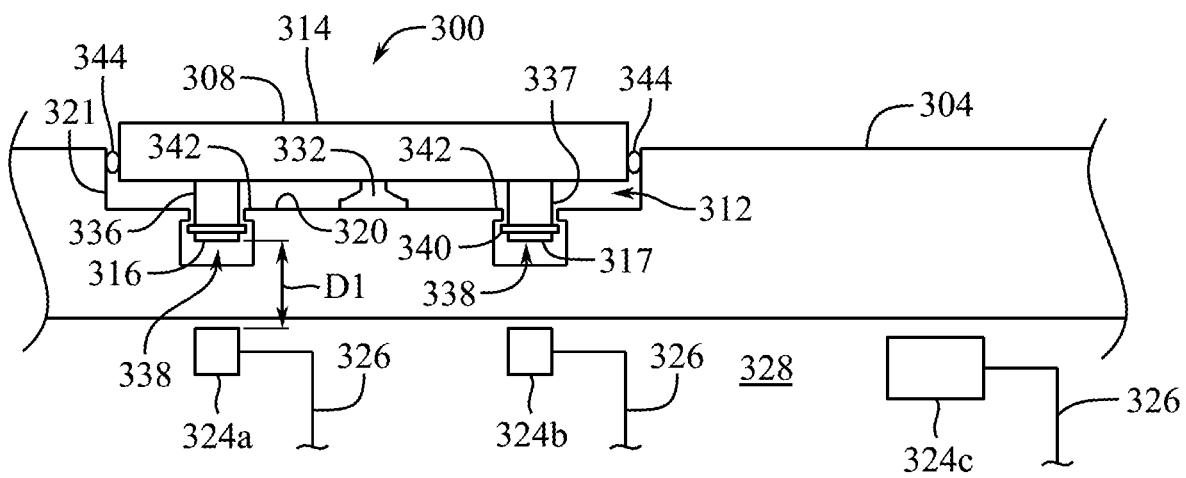
FIG. 3A shows a side cross-sectional view of a button assembly as taken, for example, through section lines 1-1 in FIG. 2A.
Figure 3B:
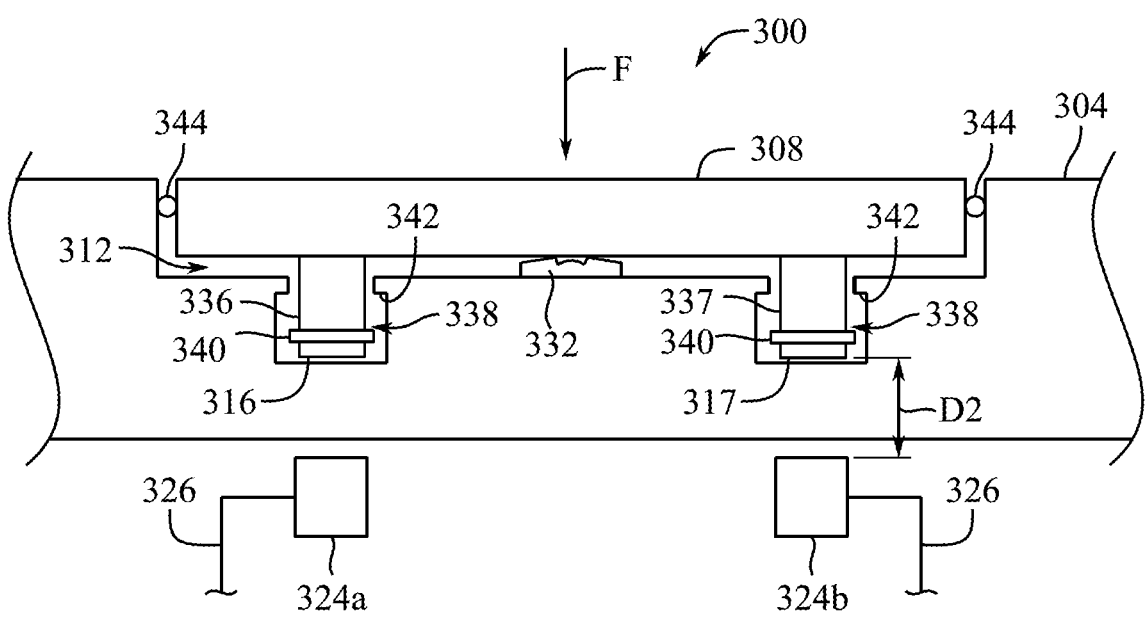
FIG. 3B shows a side cross-sectional view of the button assembly of FIG. 3A in a depressed condition.

FIG. 3A shows a side cross-sectional view of a button assembly 300 in a resting, un-pressed state. FIG. 3B shows a side cross-sectional view of the button assembly 300 in a pressed state. The button assembly 300 can be substantially similar to, including some or all of the features of, other button assemblies described herein, including assemblies 100 and 200. The button assembly 300 can include a button 308 at least partially positioned within a recess 312 defined by the housing 304 of an electronic device, such as those discussed with reference to FIGS. 2A-2C. Notably, the recess 312 (and its side and bottom walls) does not go entirely through the housing 304, providing no through-hole access to the internal volume 328. More specifically, the recess 312 can be defined by a base portion or floor 320 and a sidewall 321. The floor 320 and the sidewall 321 can be unitary and continuous (i.e., uninterrupted by openings or gaps that provide fluid communication to the internal volume 328) components of the housing 304.

In some examples, the button assembly 300 comprises one or more motion guides or pins 336, 337. The specific example illustrated in FIG. 3A depicts two pins 336, 337, however, it will be understood that the principles described herein can be implemented with more or fewer pins than shown. The pins 336, 337 can extend from a bottom surface of the button 308 (opposite the input surface 314). The pins 336, 337 can be attached to the button 308. In some examples, the pins 336, 337 are integrally formed with the button 308. The pins 336, 337 can be received into corresponding cavities 338 formed in the floor 320 of the recess 312. In some examples, the pins 336, 337 are both disposed in a single common/shared cavity 338.

In some examples, the motion guides or pins 336, 337 can be mechanisms that help to keep the input surface 314 parallel with the surrounding outer surface of the housing 304 of the device during a push event. The pins 336, 337 can include or be replaced by any number of well-known parallel-motion stabilizer mechanisms commonly used in buttons, such as scissor mechanisms, butterfly mechanisms, anti-roll bar (or anti-sway bar) mechanisms, two or more fit pins in tight fit guide holes, etc.

In some examples, the pins 336, 337 can be retained in the cavities 338 by retention mechanisms 340 attached to or formed on the shafts of the pins 336, 337. For example, the retention mechanisms 340 can be retention clips (e.g., spring clips) that are configured to contact a protrusion, trim or ledge 342 extending radially inward from an opening of the cavities 338 to contact the retention mechanisms 340.

In some examples, the diameters of the apertures of the cavities 338, defined by the openings into the cavities 338 at the ledges 342, can be smaller than the outer diameters of the retention mechanisms 340. Thus, the retention mechanisms 340 can prevent the pins 336, 337 from being inadvertently removed from the cavities 338, consequently preventing the button 308 from being inadvertently removed from the recess 312 (e.g., falling out of the recess 312), while still allowing for limited linear motion of the button 308 (e.g., in and out within a range of motion defined by the cavity 338 dimensions and defined in part by mechanical interaction between a retention mechanism 340 and a ledge 342).

In some examples, retention mechanisms 340 can travel uni-directionally through the openings of the cavities 338. In other words, the retention mechanisms 340 can allow the pins 336, 337 to be inserted into the cavities 338, but prevent the pins 336, 337 from being completely withdrawn after being inserted past the ledges 342. The retention mechanisms 340 can include retaining clips, screws, adhesives, welds, rivets, or any other suitable mechanism to retain the button to the housing while still allowing for motion of the button 308 and the emissive objects 316, 317.

The button assembly 300 can include one or more emissive objects. For example, the button assembly 300 can include a first emissive object 316 and a second emissive object 317 (collectively referred to as "emissive objects 316, 317"). The emissive objects 316, 317 can be substantially similar to, including some or all of the features of, the other emissive objects described herein, including, for example, emissive object 116. In some examples, the pins 336, 337 themselves are the emissive objects 316, 317. In other words, the pins 336, 337 and the emissive object 316, 317 can be a unitary component, such as a pin 336 that is a magnetic structure or comprises magnetic material. The emissive objects 316, 317 can be items or objects that are detectable through the housing 304 by corresponding sensors 324a, 324b. In some examples, the emissive objects 316, 317 can be positioned at ends of the pins 336, 337, respectively. For example, each pin 336, 337 can have a first end attached to the bottom surface of the button 308, and a second end, opposite the first end, that is disposed within its respective cavity 338 and attached to the respective emissive object 316, 317. Positioning the emissive object at the end of the pin can ensure its emitted field(s) are more easily detectable by the sensor(s) within the internal volume 328 due to their field(s) having higher strength due to their closer proximity to the sensor(s).

In some examples, the first emissive object 316 can be positioned proximate a first sensor 324a, and the second emissive object 317 can be positioned proximate a second sensor 324b. As shown in FIG. 3A, in a rest state in which the button 308 is not depressed and is elevated relative to the recess floor 320, the emissive objects 316, 317 can be positioned a first distance D1 away from their corresponding sensors 324a, 324b.

As shown in FIG. 3B, in a second, depressed state in which the button 308 is pressed downward into the recess 312 by a force F, the emissive objects 316, 317 can be positioned a second distance D2 away from the corresponding sensors 324a, 324b. The second distance D2 can be detectably less than the first distance D1. In some examples, a distance between the first emissive object 316 and the first sensor 324a can be different than a distance between the second emissive object 317 and the second sensor 324b. This can be the result of a tilt or off center press by the user. The system may be programmed to determine that a key press has been made in response to the sensors 324a, 324b detecting that one or more of the emissive objects 316 or 317 is located a distance D2 from the corresponding sensor 324a or 324b. Alternatively, the system may be programmed to only consider a key press is made in response to both emissive objects 316, 317 being respectively located the second distance D2 from the sensors 324a, 324b.

The first sensor 324a can be positioned close enough to the first emissive object 316 that the first sensor 324a can sense, measure, or detect the emissions, such as electrical or magnetic fields, from the first emissive object 316. The first sensor 324a can detect emissions from the first emissive object 316 continuously (i.e., regardless of whether the button 308 is in a rest, un-pressed state or in a depressed state). In some examples, the first sensor 324a only detects the emissions from the first emissive object 316 when the button 308 is in a depressed state (i.e., the first emissive object 316 is a distance D2 or less from the first sensor 324a). Thus, the first sensor 324a can monitor motion or movement of the first emissive object 316.

In order to avoid cross-interference between the emissive objects 316, 317 and the sensors 324a, 324b, the first sensor 324a may not be capable of detecting emissions from the second emissive object 317. For example, the first sensor 324a may be positioned too far from the second emissive object 317 to detect its emissions (or too far to detect its emissions as signal instead of noise or background radiation). In other examples, the emissions from the first emissive object 316 can be different than the emissions from the second emissive object 317. Accordingly, the first sensor 324a can be tuned to detect the emissions from the first emissive object 316, but not the second emissive object 317. In this manner, the emissions from the second emissive object 317 are prevented from interfering with the readings of the first sensor 324a.

Likewise, the second sensor 324b can be positioned close enough to the second emissive object 317 that the second sensor 324b can sense, measure, or detect the emissions from the second emissive object 317 in order to monitor motion of the second emissive object 317. The second sensor 324b can detect emissions from the second emissive object 317 continuously (i.e., regardless of whether the button 308 is in a rest, unpressed state or in a depressed state). In some examples, the second sensor 324b only detects the emissions from the second emissive object 317 when the button is in a depressed state (i.e., the second emissive object 317 is at a predetermined distance D2 or less from the second sensor 324b). In some examples, the second sensor 324b is not capable of detecting emissions from the first emissive object 317. In some examples, the second sensor 324b is positioned too far from the first emissive object 316 to detect its emissions. In some examples, the emissions from the first emissive object 316 are different than the emissions from the second emissive object 317, and the second sensor 324b is tuned to detect the emissions from the second emissive object 317, but not the first emissive object 316. In this manner, the emissions from the first emissive object 316 are prevented from interfering with the readings of the second sensor 324b. In some examples, a single sensor is used to detect both emissive objects 316, 317. In some examples, the assembly 300 includes only a first emissive object 316, and the second sensor 324b performs the function of the third sensor 324c described below, with the assembly 300 having only the first sensor 324a for monitoring the first emissive object 316 and the second sensor 324b monitoring an ambient environment.

The button assembly 300 can include the first sensor 324a, the second sensor 324b, and a third sensor 324c (collectively referred to as "sensors 324"). The sensors 324 can be substantially similar to, including some or all of the features of, the sensors described herein, including sensor 124 and 229. The sensors 324 can be disposed within the internal volume 328 of the electronic device. Each sensor 324 can be established in electrical communication with a processor disposed within the internal volume 328, such as, for example, via connections 326. As depicted, the first sensor 324a can be positioned proximate (e.g., beneath) the first emissive object 316. Similarly, the second sensor 324b can be positioned beneath the second emissive object 317.

The third sensor 324c can be positioned spaced away from the emissive objects 316, such as being completely separate from the rest of the button assembly 300. The third sensor 324c can be positioned at a sufficient distance from the objects 316, 317 that their fields do not measurably affect the output of the third sensor 324c (e.g., they do not affect the measurements obtained via the third sensor 324c any more than background signals or noise). The third sensor 324c can be configured to detect ambient emissions or fields from the external environment that could generate false button presses within the button assembly 300. For example, the electronic device might be exposed to a strong external magnetic field that falsely triggers the first sensor 324a and/or the second sensor 324b, signaling that the button is pressed. The third sensor 324c, which would also be exposed to the external magnetic field, can signal to the processor the presence of an external field, and thus the processor can determine if it should disregard the signals from the first sensor 324a and/or the second sensor 324b. Additionally, the third sensor 324c can provide a baseline or noise measurement to a processor so that the signals from the objects 316, 317, when the button assembly is pressed, can be differentiated from the baseline or noise measurement. The sensors 324 can include a magnetometer or a Hall-effect sensor to detect magnetic fields emitted by the emissive objects 316, 317. In some examples, the housing 304 can include shielding, such as faraday shielding, to block electromagnetic fields from interfering with the button assembly.

In some examples, the button assembly 300 can include a return mechanism 332 that is positioned between the button 308 and a floor 320. The button assembly 300 can be configured to move or displace in response to an input to the input surface 314, such as a user press to the input surface 314. The return mechanism 332 can provide the user with tactile feedback. For example, when the user presses the button 308, the downward force of the button 308 collapses the return mechanism 332 (as depicted in FIG. 3B). In some examples, the collapse of the return mechanism 332 can produce a "click" feel or sound. Thus, the return mechanism 332 can provide a tactile response or feedback.

The return mechanism 332 can be a mechanism that returns the input surface 314 to its original rest position. The return mechanism 332 can include one or more springs, buckling domes (made from elastic and/or compressible materials such as silicone, metal, plastic, similar materials, or combinations thereof), magnets, or compressible fluids. In some examples, the return mechanism 332 can include a metal dome having a biased position that the metal dome returns to after being deformed. In some examples, the return mechanism 332 can include a spring, an elastic body, or a hinge mechanism, such as a scissor or butterfly hinge mechanism.

Once the button 308 (i.e., the input member or button body) is displaced to a threshold distance, the return mechanism 332 collapses (compare FIGS. 3A and 3B, where the return mechanism 332 has collapsed in FIG. 3B from un-collapsed configuration in FIG. 3A.)

The collapse or tactile feedback of the return mechanism 332 can be tuned to coincide with a produced electrical signal that may be used to activate one of many aspects of the electronic device. For example, the change in tactile feedback (i.e., the "bump" felt by the user when a dome return mechanism collapses) provided by the return mechanism 332 can occur at the same time (i.e., substantially simultaneously as perceived by the user) with a determination by the processor that the button 308 was pressed. The collapse of the return mechanism 332 can coincide with a modification of a graphical output of the electronic device produced or displayed on the display of the electronic device. That is, the return mechanism 332 can be tuned to provide tactile or auditory feedback at the same moment the display provides graphical output to the user or one or more other functions of the button are implemented by the computing device.

In some examples, the button mechanism 300 can optionally include a gasket or seal 344 positioned between the sidewall of the recess 312 and the button 308. The seal 344 can assist in preventing particle ingress into the recess 312. Despite the internal volume 328 being fluidically isolated from the recess 312, it may be advantageous to include the seal 344 to prevent particles and debris from interfering with the button assembly 300, for example clogging the recess 312 or cavities 338.

Figure 4:
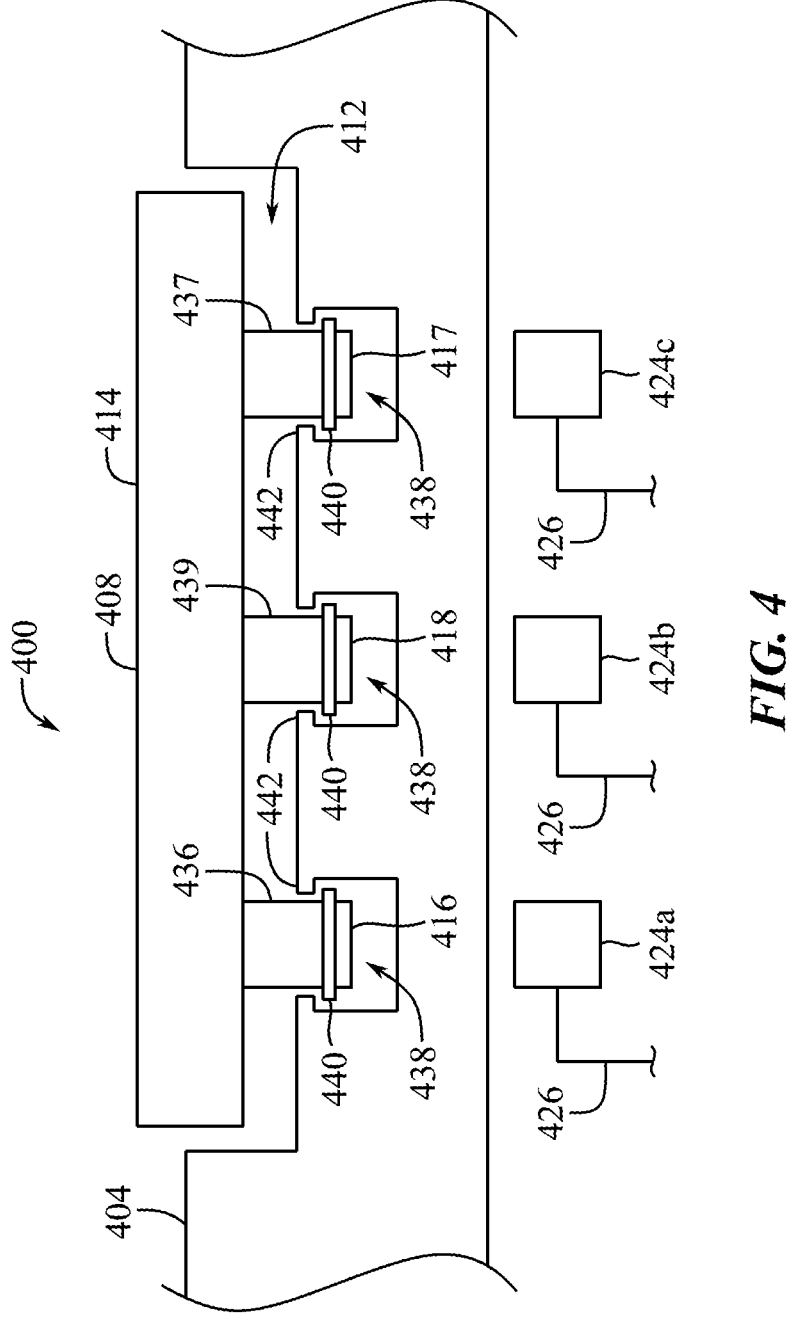
FIG. 4 shows a side cross-sectional view of a button assembly.

FIG. 4 shows a side cross-sectional view of a button assembly 400. The button assembly 400 can be substantially similar to, including some or all of the features of, the button assemblies described herein, including assemblies 100-300, with reference numbers ending in like digits denoting like components. The button assembly 400 can include a button 408 at least partially positioned within a recess 412 defined by the housing 404 of an electronic device. Pins 436, 437, 439 can extend into corresponding cavities 438 in the floor of the recess 412. The pins 436, 437, 439 can be retained within the cavities 438 by one or more retention clips 440. In some examples, each pin 436, 437, 439 includes an emissive object 416, 417, 418, respectively. The emissive objects 416, 417, 418 can be detectable by sensors 424a, 424c, 424b, respectively.

FIG. 4 can be substantially similar to the embodiment depicted in FIGS. 3A and 3B with one exception being that the button assembly 400 includes a third pin 439, a third emissive object 418, and a corresponding third sensor 424b. The interaction between the third emissive object 418 and the third sensor 424b can be substantially similar to the emissive objects 316, 317 and sensors 324a, 324b described above with reference to FIGS. 3A and 3B.

The third emissive object 418 can provide a redundancy that advantageously helps to verify or confirm measurements or readings reported by the first sensor 424a and second sensor 424c. For example, in order to determine that the button 408 is pressed, it may be required that threshold emissions of all three emissive objects 416, 418, 417 are detected by their corresponding sensors 424a, 424b, 424c. In other words, all three emissive objects 416, 417, 418 may need to be simultaneously detected by their respective sensors 424a, 424c, 424b. In some examples, in order to determine that the button 408 is pressed, it may be required that at least two of the emissive objects 416, 417, 418 are detected. Thus, if emission variation or interference with one object causes the corresponding one of the three sensors to not detect a button press, if the other two sensors detect a press, the computing device can still register the button being triggered. By comparison, if only two signals are provided to the computing device from two sensors, the computing device may not have sufficient information to determine whether one of the signals is a false positive or false negative.

The emissive objects 416, 417, 418 can be arranged in a variety of configurations. For example, the emissive objects 416, 417, 418 may be coaxial along a common linear plane. In some example, the emissive objects 416, 417, 418 may be positioned in a triangular configuration relative to each other (i.e., their depth positions relative to the plane of the sheet of FIG. 4 can vary if they are not laterally, linearly aligned). In some examples, the emissive objects 416, 417, 418 are selectively positioned to enhance the ability of the system to detect a tilted key press. In other words, the position of the emissive objects 416, 417, 418 relative to one another, can be used to determine an attitude or angular orientation of the button 408 relative to the recess floor when the button tilts.

Figure 5:
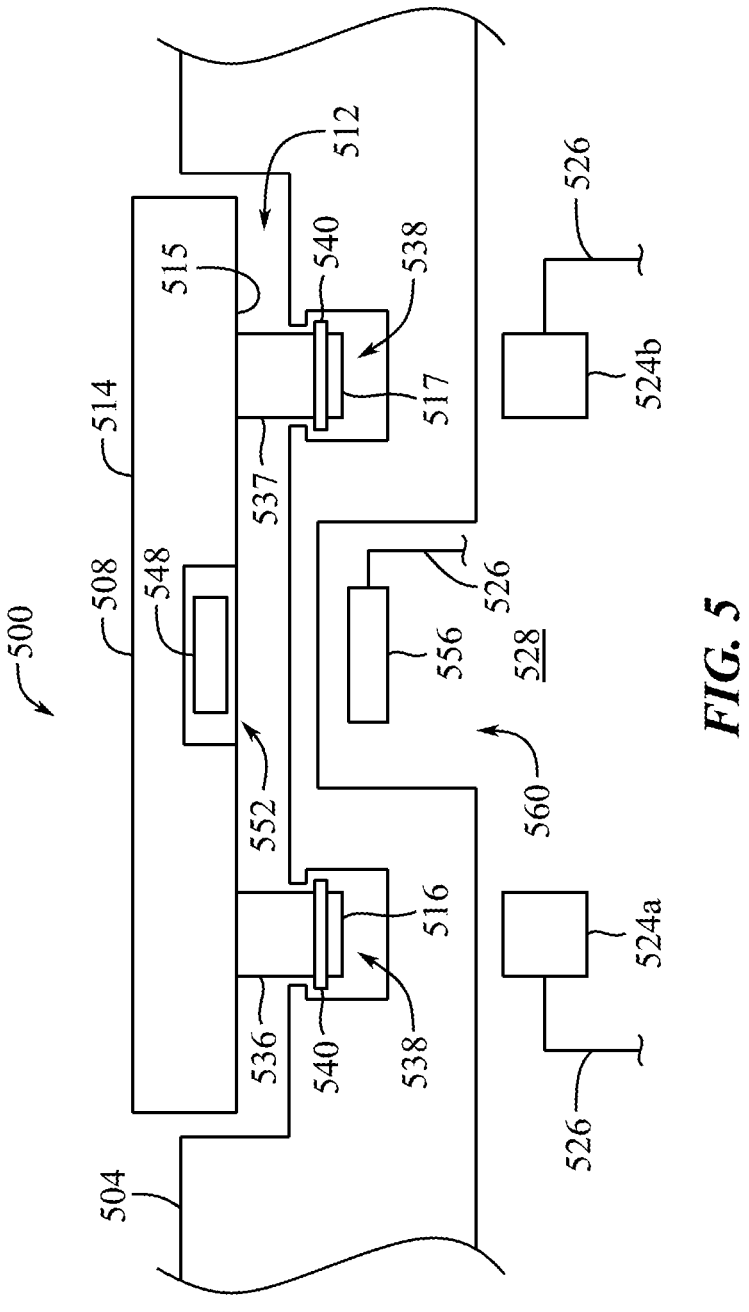
FIG. 5 shows a side cross-sectional view of a button assembly.

FIG. 5 shows a side cross-sectional view of a button assembly 500. The button assembly 500 can be substantially similar to, including some or all of the features of, the button assemblies described herein, including assemblies 100-400, with reference numbers ending in like digits denoting like components. The button assembly 500 can include a button 508 at least partially positioned within a recess 512 defined by the housing 504 of an electronic device. Pins 536, 537 can extend into corresponding cavities 538 in the floor of the recess 512. The pins 536, 537 can be retained within the cavities 538 by one or more retention clips 540. In some examples, each pin 536, 537 respectively includes an emissive object 516, 517. The emissive objects 516, 517 can be respectively detectable by sensors 524a and 524b.

FIG. 5 is substantially similar to the embodiments depicted in FIGS. 3A, 3B, and 4 while including a third emissive object 548 and a third sensor 556. The interaction between the third emissive object 548 and the third sensor 556 can be substantially similar to the emissive objects 316, 317 and sensors 324a, 324b, described above with reference to FIGS. 3A and 3B. The third emissive object 548 can be positioned within a button body recess 552 in a bottom surface 515 of the button 508 (opposite the input surface 514). In some examples, the button body recess 552 can be configured to collect particles or debris that enter the main recess 512. In some examples, the button body recess 552 can be intentionally designed to collect debris in order to prevent the debris from entering, and potentially clogging, the cavities 538. For example, the button body recess 552 can include a strong magnet to pull metallic shavings into the button body recess 552. In some examples, the third emissive object 548 is entirely encapsulated by the button 508 within the button body recess 552.

The third sensor 556 can be recessed within the housing 504. For example, an interior surface of the housing 504 can define a cavity 560 that receives the third sensor 556. In some examples, the third sensor 556 is entirely encapsulated by the housing 504. Advantageously, by being positioned within the cavity 560, the third sensor 556 can near closer to the third emissive object 548, and therefore, potentially be able to collect more accurate readings from the third emissive object 548 as compared to the other sensors 524. In some examples, a distance between the third emissive object 548 and the third sensor 556 is approximately equal to a distance separating the first and second emissive objects 516, 517 from the sensors 524a, 524b, respectively.

Figure 6:
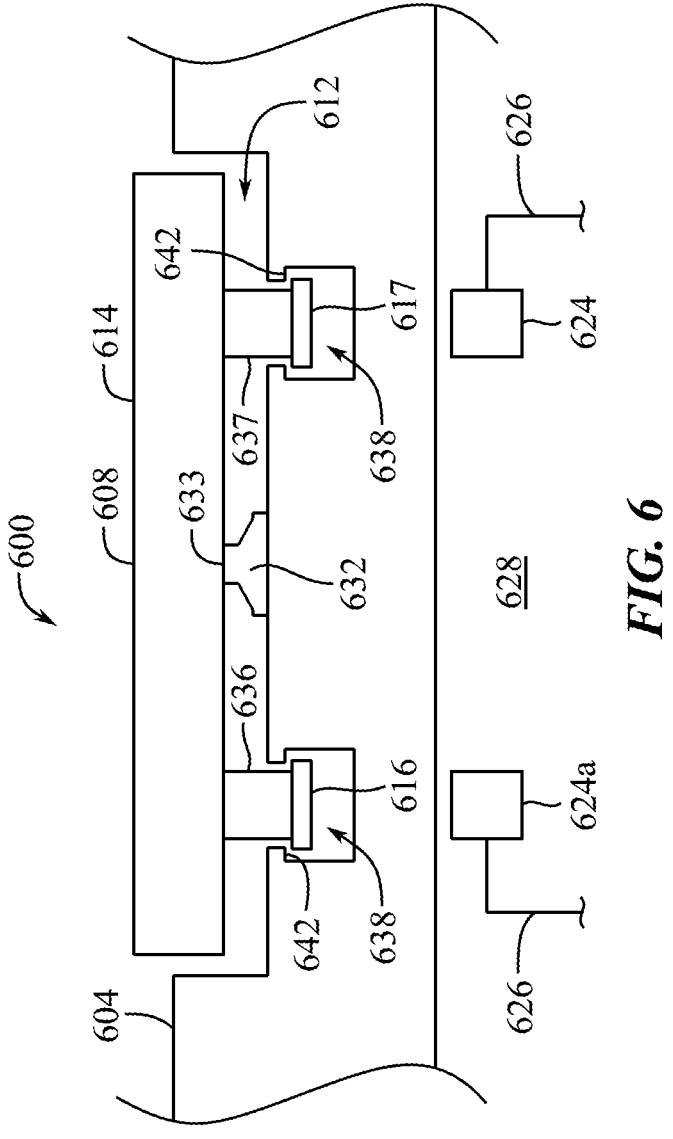
FIG. 6 shows a side cross-sectional view of a button assembly.

FIG. 6 shows a side cross-sectional view of another button assembly 600. The button assembly 600 can be substantially similar to, including some or all of the features of, the button assemblies described herein, including assemblies 100-500, with reference numbers ending in like digits denoting like components. The button assembly 600 can include a button 608 at least partially positioned within a recess 612 defined by the housing 604 of an electronic device. Pins 636, 637 can extend into corresponding cavities 638 in the floor of the recess 612. In some examples, each pin 636, 637 includes an emissive object 616, 617, respectively. The emissive objects 616, 617 can be detectable by sensors 624a and 624b, respectively, that are positioned in an internal volume 628 defined by the housing 604. This configuration can be beneficial for emissive objects such as NFC tags or RFID tags since the tags can be attached or embedded in downward-facing surfaces of the pins 636 to facilitate better activation of the tags by the sensors 624 (or associated RFID emitters within the internal volume 628) and better transmission and reception of signals produced by the tags in response to their excitement and activation.

In some examples, the emissive objects 616, 617 can be used to retain the button 608 in place. For example, the emissive objects 616, 617 can be attached to respective ends of the pins 636, 637. The emissive objects 616, 617 can have diameters that are larger than the diameters of the openings of the cavities 638 at the ledges 642. In this manner, the emissive objects 616, 617 themselves can retain the button 608 within the recess 612 while still allowing for limit movement of the button 608 and pins 636, 637.

Figure 7:
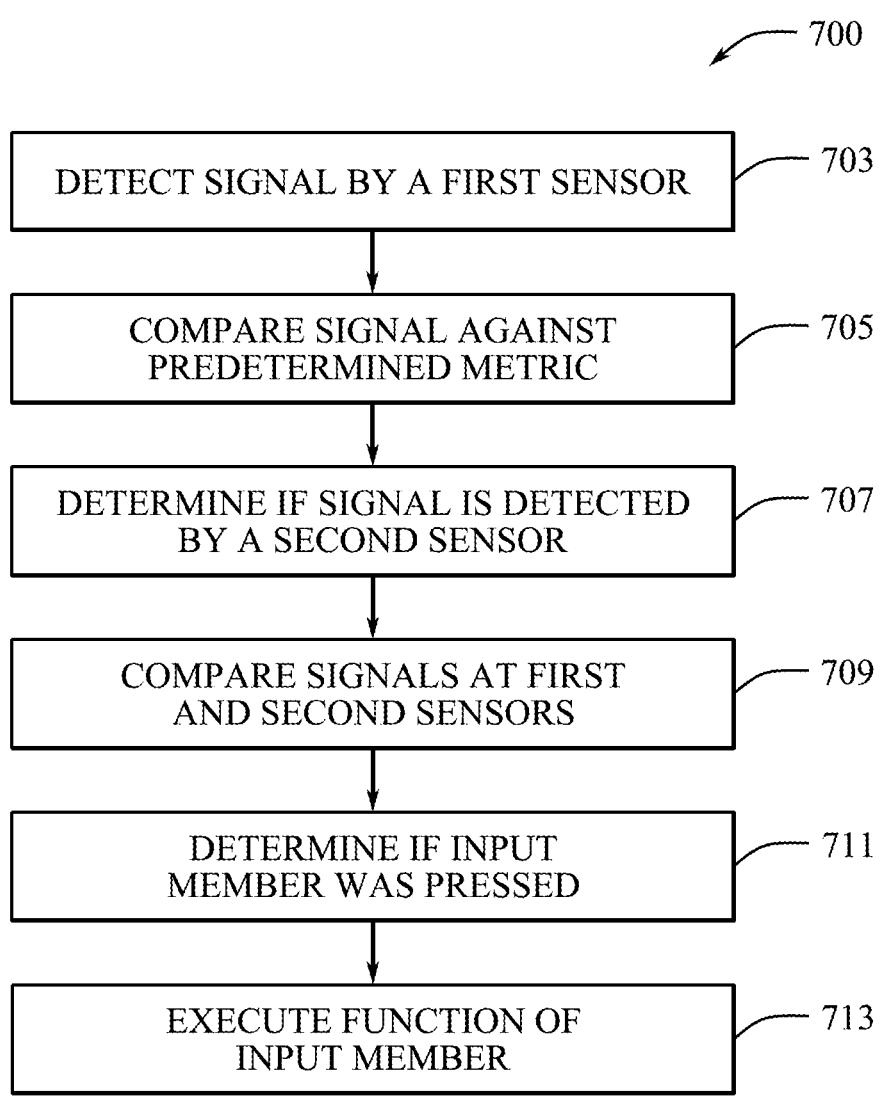
FIG. 7 shows a process flow diagram.

FIG. 7 shows a flow diagram of a process 700 for determining or detecting a button press in various button assemblies described herein. In some embodiments, the process 700 can be part of a set of electronic instructions (e.g., 225) stored by the memory (e.g., 207) and executable by the processor (e.g., 203) of computing devices disclosed herein. At block 703, an electromagnetic signal or emission, provided by a first emissive object, can be detected by a first sensor. The electromagnetic signal (or a sufficient measurement of the signal), detected by the first sensor, can correspond to and coincide with the event of the button being pressed.

At block 705, the electromagnetic signal or sensor output signal can be compared against a predetermined metric or threshold. For example, if the signal meets a predetermined threshold, the processor can then determine that the first sensor is detecting a press event of the button (i.e., that the button has moved to the depressed position of FIG. 3B).

At block 707, it can be determined whether an electromagnetic signal or emission is detected by a second sensor. It will be understood that block 707 is optional and can be omitted from the process 700. In some examples, the signal can be the same type or magnitude of signal as detected by the first sensor. In other examples, the signal can be a different type of magnitude of signal produced by detection of a second emissive object (e.g., one signal can be indicative of a change in a magnetic field, and the other can be indicative of a change in electric field or IR light intensity). In still other examples, the second signal can be detected from the external environment, and the second sensor can be configured to prevent false positives created by such external fields (e.g., as with third sensor 324b of FIG. 3A). Some embodiments of process 700 can optionally include determining whether an electromagnetic signal or emission is detected by a third sensor.

At block 709, the system can compare the signal of the first sensor and the signal of the second sensor. Block 709 is optional and can be omitted from the process 700. In some examples, upon determining that the first signal and the second signal are within a predetermined threshold range of one another, it can be determined that a button press was made. For example, the first sensor can output a signal in response to the presence of the first emissive object. Likewise, the second sensor can output a signal in response to the presence of the second emissive object. The computer (e.g., a processor) can receive both signals and can compare their magnitudes. If a difference between the signal outputs or magnitudes is within a predetermined range, the processor can take an action, such as determining that the button assembly has been pressed and therefore triggering a function intended to coincide with operation of the button assembly by a user. Alternatively, if finding that the first signal and the second signal are within a predetermined threshold range of one another, the processor may determine that a false field (e.g., signal interference from an external or ambient field that is not a result of an emissive object of the button assembly) is causing or changing one of the signals. This scenario might apply, for example, to the sensor 324*a* and/or 324*b* compared against the sensor 324*c* of FIG. 3A. An additional optional implementation of process 700 can include comparing signals detected by the first sensor, the second, and a third sensor.

At block 711, based on the previous determinations and comparisons, the system can determine whether the input member was pressed. If it is determined that the button was pressed, at block 713, the system can execute the function of the input member. For example, the execution of the function of a button press may cause a modification of a graphical output of the electronic device produced or displayed on the display of the electronic device. That is, the display can provide graphical output to the user. It will be understood that one or more of the blocks of the process discussed above are optional and can be omitted from the process 700.

As used herein, conjunctive terms (e.g., "and") and disjunctive terms (e.g., "or") should be read as being interchangeable (e.g., "and/or") whenever possible. Furthermore, in claims reciting a selection from a list of elements following the phrase "at least one of," usage of "and" (e.g., "at least one of A and B") requires at least one of each of the listed elements (i.e., at least one of A and at least one of B), and usage of "or" (e.g., "at least one of A or B") requires at least one of any individual listed element (i.e., at least one of A or at least one of B).

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device, comprising:
   a housing defining an exterior surface and an internal volume, the exterior surface defining a recess having a base portion and a sidewall;
   a button body positioned within the recess;
   an emissive object attached to the button body, the emissive object being movable between a first position and a second position, the emissive object configured to emit electromagnetic radiation;
   a first sensor positioned within the internal volume, the first sensor configured to generate a first signal in response to detecting electromagnetic radiation of the emissive object in the first position, wherein the first sensor is positioned a first distance from the button body;
   a second sensor positioned within the internal volume and configured to generate a second signal, wherein the second sensor is positioned a second distance from the button body, the second distance being different from the first distance, wherein while at the second distance, the second sensor is unable to detect the electromagnetic radiation from the emissive object in excess of a noise or background filtering threshold;
   a processor in electrical communication with the first sensor and the second sensor; and
   a memory having electronic instructions encoded thereon that, when executed by the processor, cause the processor to respond to the first signal and the second signal.

2. The electronic device of claim 1, further comprising a motion guide extending from the button body into the recess to guide the button body linearly toward the base portion.

3. The electronic device of claim 2, further comprising a retention component to retain the button body within the recess.

4. The electronic device of claim 3, wherein the base portion defines a cavity receiving the motion guide and the retention component.

5. The electronic device of claim 1, wherein the emissive object comprises a magnet.

6. The electronic device of claim 1, wherein the emissive object comprises a near-field communications tag.

7. The electronic device of claim 1, wherein the emissive object is a first emissive object, the electronic device further comprising a second emissive object configured to emit a second electromagnetic radiation, wherein a third sensor is configured to detect the second electromagnetic radiation.

8. The electronic device of claim 1, further comprising a third sensor configured to generate a third signal, wherein the electronic instructions are configured to cause the processor to compare the first signal, the second signal, and the third signal.

9. The electronic device of claim 8, wherein the third sensor is positioned at the first distance from the button body.

10. The electronic device of claim 8, wherein the instructions are configured to cause the processor to determine if the button body was pressed based on the second signal and based on at least one of the first signal and the third signal.

11. The electronic device of claim 1, wherein the continuous component fluidically isolates the internal volume from the exterior surface.

12. An input assembly, comprising:
   a waterproof wall defining an exterior surface and an interior surface, the exterior surface being exposed to an ambient environment, the interior surface being fluidically isolated from the ambient environment;
   an input member attached to the exterior surface and movable relative to the exterior surface, the input member comprising:
      a body portion defining an input surface of the input member, the body portion positioned within a recess defined in the exterior surface of the waterproof wall;
      a retention feature extending from the body portion and configured to limit movement of the input member relative to the waterproof wall, the retention feature positioned within a cavity extending from the recess, the cavity having a first width less than a second width of the recess, the first width and the second width measured in a direction parallel to the input surface;
   a first movable object attached to the input member;
   a second movable object attached to the input member spaced apart from the first movable object;
   a first sensor positioned at the interior surface and configured to output a first signal indicating motion of the first movable object through the waterproof wall;
   a second sensor positioned at the interior surface and configured to output a second signal indicating motion of the second movable object through the waterproof wall;
   a processor configured to output a third signal when the input member is depressed beyond a predetermined threshold distance relative to the waterproof wall in response to detecting that the first signal indicates motion of the first movable object beyond the predetermined threshold distance relative to the first sensor and in response to detecting that the second signal indicates motion of the second movable object beyond the predetermined threshold distance relative to the second sensor.

13. The input assembly of claim 12, further comprising a return mechanism disposed between the input member and the waterproof wall.

14. The input assembly of claim 13, wherein the return mechanism is tuned to provide feedback substantially simultaneous with the processor determining that the input member has been depressed beyond the predetermined threshold distance.

15. The input assembly of claim 12, further comprising a third movable object and a third sensor configured to monitor motion of the third movable object.

16. The input assembly of claim 15, wherein the retention feature comprises a first shaft, a second shaft, and a third shaft, each shaft extending from the input member into corresponding apertures defined by the exterior surface, the first movable object attached to the first shaft, the second movable object attached to the second shaft, the third movable object attached to the third shaft.

17. The input assembly of claim 15, wherein the third sensor is positioned within an internal volume at least partially defined by the interior surface, the third sensor being a first distance from the exterior surface, the first sensor and second sensor being a second, greater distance from the exterior surface.

18. An electronic device, comprising:

a housing defining an exterior surface and an internal volume, the exterior surface defining a recess;

a transmissive barrier forming a waterproof interface between the recess and the internal volume;

a button having a body portion having an input surface, a shaft extending from the body portion, and a retainer clip attached to the shaft, the shaft extending at least partially into a cavity in a wall of the recess, the retainer clip having an enlarged diameter relative to the shaft and limiting withdrawal of the shaft from the cavity, the shaft having a diameter less than a width of the input surface;

a radiating object movable with the button and at least partially positioned within the cavity;

a sensor positioned within the internal volume, the sensor configured to monitor a position of the radiating object through the transmissive barrier and generate a signal in response to the position of the radiating object; and a controller disposed in the internal volume and configured to monitor motion of the button based on the signal from the sensor.

19. The electronic device of claim 18, wherein the housing comprises a first material, and the transmissive barrier comprises a second material, wherein the second material is different from the first material.

20. The electronic device of claim 18, wherein the radiating object and the shaft are a unitary component.

* * * * *